(12) United States Patent
Hasegawa et al.

(10) Patent No.: US 7,815,301 B2
(45) Date of Patent: Oct. 19, 2010

(54) WATER-BASED PIGMENT DISPERSION, PRODUCTION METHOD THEREOF, WATER-BASED PIGMENT INK, PRODUCTION METHOD THEREOF, INK RECORD, INKJET RECORDING APPARATUS, AND INKJET RECORDING METHOD

(75) Inventors: Shin Hasegawa, Numazu (JP); Keishi Taniguchi, Susono (JP); Minoru Hakiri, Numazu (JP); Yasuyuki Hosogi, Numazu (JP); Yuji Natori, Numazu (JP); Shigeo Hatada, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 972 days.

(21) Appl. No.: 11/375,258

(22) Filed: Mar. 15, 2006

(65) Prior Publication Data

US 2006/0209149 A1 Sep. 21, 2006

(30) Foreign Application Priority Data

Mar. 17, 2005 (JP) ............................. 2005-077729
Jan. 17, 2006 (JP) ............................. 2006-008598

(51) Int. Cl.
*G01D 11/00* (2006.01)
(52) U.S. Cl. ..................... 347/100; 347/95; 347/96; 106/31.6; 523/160
(58) Field of Classification Search .............. 347/100, 347/95, 96, 101; 106/31.6, 31.27, 31.13; 523/160
See application file for complete search history.

(56) References Cited

U.S. PATENT DOCUMENTS

| | | | |
|---|---|---|---|
| 4,978,709 A | 12/1990 | Taniguchi et al. | |
| 5,539,073 A * | 7/1996 | Taylor et al. | 526/323 |
| 6,063,835 A | 5/2000 | Ohshima et al. | |
| 6,348,519 B1 | 2/2002 | Ohshima et al. | |
| 6,786,959 B2 | 9/2004 | Hakiri et al. | |
| 6,814,792 B2 | 11/2004 | Taniguchi et al. | |
| 6,881,251 B2 | 4/2005 | Taniguchi et al. | |
| 6,929,686 B2 | 8/2005 | Soga et al. | |
| 2001/0029273 A1 | 10/2001 | Taniguchi et al. | |
| 2003/0024439 A1* | 2/2003 | Shigeo et al. | 106/31.58 |
| 2003/0121446 A1* | 7/2003 | Taniguchi et al. | 347/100 |
| 2003/0125414 A1* | 7/2003 | Nakajima et al. | 523/160 |

(Continued)

FOREIGN PATENT DOCUMENTS

JP 56-147863 11/1981

(Continued)

OTHER PUBLICATIONS

U.S. Appl. No. 11/834,059, filed Aug. 6, 2007, Natori, et al.

(Continued)

*Primary Examiner*—Manish S Shah
(74) *Attorney, Agent, or Firm*—Oblon, Spivak, McClelland, Maier & Neustadt, L.L.P.

(57) ABSTRACT

The object of the present invention is to provide a water-based pigment dispersion containing a pigment, a dispersing agent, a resin emulsion, and water, the water-based pigment dispersion is subjected to a heat treatment. The present invention also provides a water-based pigment ink containing the water-based pigment dispersion, a dispersing agent, a resin emulsion, and water.

24 Claims, 4 Drawing Sheets

U.S. PATENT DOCUMENTS

| | | |
|---|---|---|
| 2003/0130377 A1 | 7/2003 | Taniguchi et al. |
| 2004/0041890 A1 | 3/2004 | Soga et al. |
| 2004/0138337 A1 | 7/2004 | Hasegawa et al. |
| 2005/0087105 A1 | 4/2005 | Taniguchi et al. |

FOREIGN PATENT DOCUMENTS

| | | |
|---|---|---|
| JP | 3-64376 | 3/1991 |
| JP | 5-105837 | 4/1993 |
| JP | 8-73785 | 3/1996 |
| JP | 10-88050 | 4/1998 |
| JP | 10-168367 | 6/1998 |
| JP | 2867491 | 12/1998 |
| JP | 2001-192583 | 7/2001 |
| JP | 2002-30243 | 1/2002 |
| JP | 2003-313475 | 11/2003 |
| JP | 2004-2715 | 1/2004 |
| JP | 2004-169008 | 6/2004 |

OTHER PUBLICATIONS

U.S. Appl. No. 12/190,946, filed Aug. 13, 2008, Hatada, et al.
U.S. Appl. No. 11/444,503, filed Jun. 1, 2006, Hakiri, et al.

* cited by examiner

WATER-BASED PIGMENT DISPERSION, PRODUCTION METHOD THEREOF, WATER-BASED PIGMENT INK, PRODUCTION METHOD THEREOF, INK RECORD, INKJET RECORDING APPARATUS, AND INKJET RECORDING METHOD

BACKGROUND OF THE INVENTION

1. Field of the Invention

The present invention relates to a water-based pigment dispersion, a method for producing the water-based pigment dispersion, a water-based pigment ink, a method for producing the water-based pigment ink, an ink record, an inkjet recording apparatus, and an inkjet recording method.

2. Description of the Related Art

An inkjet recording method has advantages over other recording methods in that it facilitates full-colorization because of the process that is simpler than those of other recording methods and in that high-resolution images can be obtained even with a simply structured apparatus. As for inkjet inks, dye-based inks of which various water-soluble pigments are dissolved in water or a mixture solution of water and an organic solvent are used, however, dye-based inks suffer from the disadvantage of being poor in resistance to light, although it excels in color tone definition. On the other hand, pigment-based inks in which carbon black and various organic pigments are dispersed are more and more studied because pigment-based inks are superior to dye-based inks in terms of resistance to light.

However, unlike dyes, pigments are water-insoluble, and thus it is important to stably disperse pigments in water in particulate state, however, such dispersion is not exactly easy to achieve. Particularly when temperature conditions of a pigment dispersion system are changed, the absorption equilibrium of pigments relative to the dispersing agent is unbalanced, and this affects interaction of pigment particles with each other and may bring about changes in physical properties in storage over a long period of time and/or occurrence of agglutinated foreign matters. Such physical property changes, particularly changes in viscosity, and/or such occurrences of a large amount of agglutinated foreign matters are deadly to inkjet printer inks. This is because thy cause changes in ink properties at inkjet heads and/or clogging of ejection nozzles, and so it may defy proper printing.

As a way to solve the problem with such changes in physical properties and/or occurrences of agglutinated foreign matters, for example, Japanese Patent Application Laid-Open (JP-A) No. 03-64376 discloses a method for preliminarily preventing agglutinated foreign matters that will arise under long-term storage conditions by heating a pigment-based ink at 50° C. for 100 hours to 500 hours.

Japanese Patent Application Laid-Open (JP-A) No. 08-73785 enables a short-time heating process in which pigments, an insoluble resin emulsion, and saccharides are heated at a temperature of 65° C. to 80° C. for a short length of time of 0.5 hours to 3 hours.

Japanese Patent Application Laid-Open (JP-A) No. 2002-30243 enables providing a pigment ink causing relatively less changes in viscosity after storage over a long period of time by heating a pigment, water, and a polysaccharide in an aqueous solution with a pH of 8 or more at temperatures of 60° C. to 180° C.

In addition, Japanese Patent Application Laid-Open (JP-A) No. 2003-313475 enables providing a pigment ink which has a sharp particle diameter distribution and excels in ink glossiness and color reproductivity by heating a colored particulate dispersion ink containing color materials and a resin at a temperature of 35° C. or more.

However, with a particulate pigment ink having a particle diameter of 150 nm or less, or a pigment ink of surfactant dispersion type, it is impossible to prevent occurrences of agglutinated foreign matters and overall changes in physical properties thereof i.e. deterioration of the pigment ink.

SUMMARY OF THE INVENTION

It is therefore an object of the present invention to provide a water-based pigment dispersion in a state of steady dispersion without causing substantial changes in physical properties thereof and/or a large amount of agglutinated foreign matters regardless of changes of temperature conditions, and a method for producing the water-based pigment dispersion. The present invention also provides a water-based pigment ink, a method for producing the water-based pigment ink, ink records, an inkjet recording apparatus, and an inkjet recording method.

As a result of keen examinations provided by the inventors of the present invention, it is found that it is possible to obtain a water-based pigment dispersion and a water-based pigment ink which are stable to changes in temperature conditions without causing substantial degrees of deterioration by heating a water-based pigment ink that has been prepared by using a specific water-based pigment dispersion or such a water-based pigment dispersion.

According to the method for producing a water-based pigment dispersion of the present invention, a water-based pigment dispersion containing a pigment, a dispersing agent, a resin emulsion, and water is subjected to a heat treatment.

The water-based pigment dispersion of the present invention is produced by subjecting a water-based pigment dispersion containing a pigment, a dispersing agent, a resin emulsion, and water to a heat treatment.

The method for producing a water-based pigment ink of the present invention includes heating a water-based pigment ink containing a water-based pigment dispersion, a dispersing agent, a resin emulsion, and water, and the water-based pigment dispersion is the water-based pigment dispersion of the present invention.

The water-based pigment ink of the present invention contains a water-based pigment dispersion, a dispersing agent, a resin emulsion, and water, and the water-based pigment dispersion is the water-based pigment dispersion of the present invention.

The ink cartridge of the present invention includes a container to house the water-based pigment ink of the present invention.

The inkjet recording apparatus of the present invention includes an ink flying unit configured to make the water-based pigment ink of the present invention fly by giving an impulse to the water-based pigment ink to thereby form an image.

The inkjet recording method of the present invention includes making the water-based pigment ink of the present invention fly by giving an impulse to the water-based pigment ink to thereby form an image.

The ink record of the present invention contains an image formed on a recording medium using the water-based pigment ink of the present invention.

DESCRIPTION OF THE PREFERRED EMBODIMENTS

Figure 1:
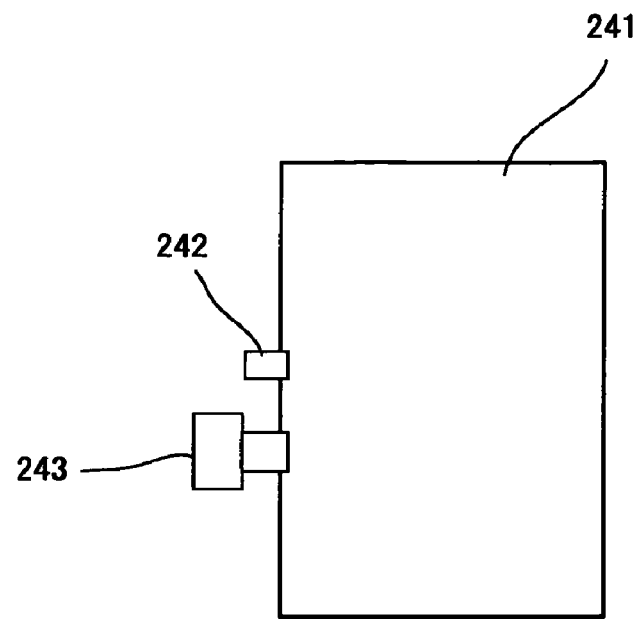
FIG. 1 is a schematic view exemplarily showing the ink cartridge of the present invention.

The water-based pigment dispersion and the water-based pigment ink of the present invention are characterized in that the water-based pigment dispersion and the water-based pigment ink are respectively produced by subjecting an aqueous solution containing a pigment, a dispersing agent, a resin emulsion and water to a heat treatment. There have been presented various methods so far to preliminarily preventing agglutinated foreign matters that will arise under long-term storage conditions by heating a water-based pigment dispersion and/or a water-based pigment ink. The present invention is, however, effective in preventing changes in physical properties of the water-based pigment dispersion and the water-based pigment ink which will arise with time, particularly effective in preventing changes in viscosity and particle diameter thereof, besides the effect stated above.

A resin emulsion used in the present invention is characterized in that at least one selected from the group consisting of polyurethanes, styrene-acrylates, and silicone acrylates are contained. Particularly for the water-based pigment dispersion, polyurethane-based resin emulsions are more preferably used.

The emulsion is the one that exists as an O/W emulsion i.e. oil-in-water emulsion when it is used as a raw material for preparing an ink or after the ink composition of the present invention is prepared. As for polyurethane-based resin emulsions, there are emulsions that a typical polyurethane-based resin being relatively hydrophilic is emulsified by externally adding an emulsifier, and self-emulsified emulsions in which a functional group serving as an emulsifier is injected to a resin itself by means of copolymerization, and the like. Both of the emulsion types can be used, however, it is needed to pay attention because there are slight differences in dispersion stability of a pigment used or emulsion particles depending on the combination of components of the ink composition. Among various combinations of a resin emulsion with a pigment and a dispersion agent, ones constantly excelling in dispersion stability are anionic self-emulsified type of emulsion resins. In this case, for the polyurethane-based resins, ether resins are preferable to polyester resins or polycarbonate resins from the perspective of sticky tendency and dispersion stability. The reason is not known exactly, however, in many cases, non-ether type resins are weak in resistance to solvents and are easily liable to increase the viscosity.

The reason is not known exactly, however, by adding the above noted resin emulsion to the water-based pigment dispersion and the water-based pigment ink and by heating them, shortening of the processing time was possible.

The dispersing agent used in the present invention is characterized in that the dispersing agent is dispersed using a surfactant. Addition of a surfactant enables to make the average particle diameter reduced to $D_{50}$ as well as to make the standard deviation of particle diameters reduced and enables to provide a high-definition printed image with a uniform image density.

The added ratio of the dispersing agent to a pigment is preferably 0.1 parts by mass to 2 parts by mass and more preferably 0.1 parts to 1.0 part relative to 1 part by mass of the pigment. By determining the added ratio of the dispersing agent ranging from 0.1 parts by mass to 2.0 parts by mass, it is possible to provide an ink solution having a small average particle diameter or a small standard deviation in the particle size distribution. When the added ratio of a dispersing agent relative to a pigment is less than 0.1 parts by mass, satisfactory chroma saturation may not be obtained because of the ink solution having a large average particle diameter and/or a large standard deviation in the particle size distribution. When the added ratio is more than 2.0 parts by mass, printing by means of an inkjet method may be difficult because of the too high viscosity of the ink solution.

The dispersing agent is not particularly limited and may be suitably selected in accordance with the necessity. For example, compounds represented by the following General Formula (1) are preferably used in that a water-based pigment dispersion and a water-based pigment ink having a small average particle diameter and a small standard deviation of the particle size distribution can be obtained.

General Formula (1)

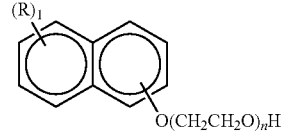

In General Formula (1), R represents any one of an alkyl group, an aryl group, and an aralkyl group; "l" is an integer of 0 to 7; and "n" is an integer of 20 to 200.

In a dispersing agent represented by General Formula (1), the value "n" is preferably an integer of 20 to 100, and more preferably an integer of 30 to 50. When the value "n" is less than 20, the dispersion stability tends to be reduced, and satisfactory chroma saturation cannot be obtained because of the ink solution having a large average particle diameter and/or a large standard deviation in the particle size distribution. When the value "n" is more than 100, the viscosity of the ink is increased, and it tends to be difficult to perform printing by means of an inkjet method. For the dispersing agent, polyoxyethylene (POE) (n=40) β-naphtyl ethers are further preferably used.

For the dispersing agent, except for the compounds for the dispersing agent represented by General Formula (1), a water-soluble styrene acrylic resin (HPD-96, manufactured by Johnson Polymer Co., Ltd.) and a styrenated phenol dispersing agent represented by the following structural formula (NOIGEN EA-177, estimated from n=25:HLB) and the like can be used.

[NOILGEN EA-177] (styrenated phenol, estimated from n 25:HLB)

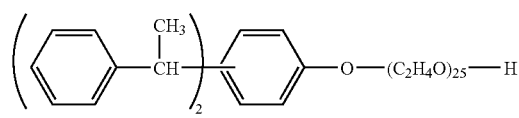

Examples of pigments used in the present invention include carbon blacks produced by a furnace method or a channel method.

Examples magenta pigments include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, and C.I. Pigment Violet 19.

Examples cyan pigments used in the present invention include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 16, C.I. Pigment Blue 22, C.I. Pigment Blue 60, C.I. Bat Blue 4, and C.I. Bat Blue 60.

Examples of yellow pigments used in the present invention include CI. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151,C.I. Pigment Yellow 154, C.I. Pigment Yellow 155, and C.I. Pigment Yellow 180.

By using C.I. Pigment Yellow 74 for the yellow pigment; C.I. Pigment Red 122 and C.I. Pigment Violet 19 for the magenta pigment; and C.I. Pigment Blue 15 for the cyan pigment, it is possible to obtain a well-balanced ink which excels in color tone and resistance to light.

The concentration of each of the pigments of each pigment dispersion in the pigment ink is preferably 0.1% by mass to 50% by mass, and more preferably 0.1% by mass to 20% by mass.

The average particle diameter ($D_{50}$) of the pigment is preferably 150 nm or less, and more preferably 100 nm or less. This is because it is possible to prevent diffuse reflection of pigment particles at printed image parts as well as to provide printed images with a uniform concentration of a pigment. In contrast, when the average particle diameter of pigment particles is more than 150 nm, the pigment particles at printed image parts diffusely reflect each other, and the chroma saturation of images degrades, and the image concentration is uneven. The reason is that with the average particle diameter within the above range, it is more effective in preventing diffuse reflection of pigment particles at printed image parts. Here, the average particle diameter of the pigment particles is the value determined by means of Micro Track UPA manufactured by NIKKISO Co., Ltd. under the conditions of 23° C. and a relative humidity of 55%.

The water-based pigment dispersion of the present invention can be prepared, for example, by the following method. First, the ratio between a pigment and a surfactant is determined. While dispersing a mixture of a pigment and water by using a dispersing device known in the art such as a sand mill, a roll mill, Beads Mill, Nanomizer, and a homogenizer, a surfactant is gradually added to the mixture to determine a ratio with which the particle diameters of the pigment are reduced and the least viscosity of the mixture. When the mixture is dispersed using Beads Mill, it is preferable to add a small amount of antifoam agent in order to prevent generation of foam. The average particle diameter of the pigment can be controlled depending on the size of beads to be poured in a dispersing device and the dispersion time, and to make the average particle diameter 150 nm or less, it is only necessary to select beads having a diameter of 0.05 mm to 1.0 mm and to take the dispersion time of 1 hour/L to 100 hours/L.

The water-based pigment ink of the present invention can be obtained by adding an ink composition, which will be described hereinafter (for example, wetting agent, surfactant, pH adjuster, antiseptic agent, and fungicide) to the water-based pigment dispersion of the present invention and stirring the mixture at a temperature of 20° C. to 30° C. for 1 hour to 3 hours.

The ink composition preferably contains a wetting agent, and the boiling point of the wetting agent is preferably 180° C. or more. When such a wetting agent is contained in the water-based pigment ink, water-retention and wettability of the ink composition can be ensured. Consequently, it is possible to achieve a water-based pigment inkjet ink that will not cause aggregation of coloring materials and increases in viscosity even when it is stored over a long period of time and is capable of keeping the flowability of dry substances over a long period of time. Further, it is possible to obtain high-ejection stability without substantially causing clogging at the ejection nozzle during printing or when the printer is rebooted after printing discontinuation.

Examples of the wetting agent include polyvalent alcohols such as ethylene glycols, diethylene glycols, 3-methyl-1,3-butylglycol, 1-3-butyl glycol, triethylene glycols, polyethylene glycols, polypropylene glycols, 1,5-pentandiol, 1,6-hexanediol, glycerine, 1,2,6-hexanetriol, 2-ethyl-1,3-hexanediol, ethyl 1,2,4-butanetriol, 1,2,3-butanetriol, and petriol; polyvalent alcohol alkyl ethers such as ethyleneglycolmonoethylether; ethyleneglycolmonobutylether, diethyleneglycolmonomethylether, diethyleneglycolmonoethylether, diethyleneglycolmonobuthylether, tetraethyleneglycolmonomethylether, and propyleneglycolmonoethylether; polyvalent alcohol allyl ethers such as ethyleneglycolmonophenylether, and ethyleneglycolmonobenzilether; nitrogen-containing heterocyclic compounds such as 2-pyrolidone, N-methyl-2-pyrolidone, N-hydroxyethyl-2-pyrolidone, 1,3-dimethylimidazolidinone, ε-caprolactam, and γ-butyrolactone; amides such as formamides, N-methylformamides, and N,N-dimethylformamides; amines such as monoethanolamines, diethanolamines, triethanolamines, monoethylamines, diethylamines, and triethylamines; sulfur-containing compounds such as dimethysulfoxides, sulfolanes, and thio-diethanol; propylene carbonates, and ethylene carbonates. Each of these wetting agents may be used alone or in combination of two or more.

Of these wetting agents, ones containing 1,3-butylglycol, 3-methyl-1,3-butylglycol, diethyleneglycol, triethyleneglycol, and/or glycerin offer advantages in preventing clogging due to ink drying i.e. defects in injection property due to water evaporation and in improving chroma saturation of images formed in accordance with the present invention.

The added amount of the wetting agent in the ink composition is preferably 0.1% by mass to 50% by mass, and more preferably 5% by mass to 40% by mass.

Preferably, by using 2-ethyl-1,3-hexanediol (hereinafter, abbreviated as EHD) to be contained in the wetting agent, it is possible to obtain printed images with high-image concentrations and less-ink exudation or striking through because of the increased ink permeability and concurrently with the more retained pigment on the surfaces.

The content of EHD is preferably 0.1% by mass to 4.0% by mass, and more preferably 0.5% by mass to 3.0% by mass. When the content is less than 0.1% by mass, the effect may be reduced, and when the content is more than 4.0% by mass, the reliability of the ink composition may degrade because of the low-solubility of EHD itself.

Examples of the surfactant include polyoxyethylenealkylethers, polyoxyethylenealkylphenylethers, polyoxyethyleneglycolesters, polyoxyethylene-polyoxypropylenedecylether; or nonionic surfactants such as acetylene surfactants, silicone surfactants, and fluorine surfactants.

In the present invention, the following surfactants may be used in combination with the above noted surfactants within the range where it does not affect ink properties.

Specific examples of commercially available nonionic surfactants include those of BT Series (manufactured by Nikko Chemicals Co., Ltd.); those of Nonipol Series (manufactured by Sanyo Chemical Industries, Ltd.); those of D-Series and P-Series (manufactured by Takemoto Oil & Fat Co., Ltd.); those of Surfinol Series (manufactured by Air Products & Chemicals Inc.); those of OLFIN Series (manufactured by Nisshin Chemicals Co., Ltd.); those of EMALEX DAPE Series (manufactured by NIHON EMULSION Co., Ltd.); silicone surfactants (DOW CORNING TORAY SILICONE CO., LTD.); and fluorine surfactants (manufactured by Neos Co.; Sumitomo 3M Ltd.; DUPONT, and Daikin Industries, Ltd., respectively).

These surfactants are added in order to accelerate the drying property of printed images by reducing the surface tension of ink and increasing permeability of ink to paper. The surface tension of the ink is preferably 50 mnN/m or less, and more preferably 40 mN/m or less. The added amount of the surfactant is preferably 0.1% by mass to 10.0% by mass, and more preferably 1.0% by mass to 5.0% by mass. When the added amount of the surfactant is less than 0.1% by mass, the drying property of the ink may degrade because of the high dynamic surface tension, and when the added amount is more than 10.0% by mass, the surfactant may be precipitated in storage over a long period of time.

The hydrophilic group of the nonionic surfactant used in the present invention is preferably a polyoxyethylene group. The reason is not known exactly, however, a polyoxyethylene group is preferable in that the charge of the surface of the pigment can be favorably kept, and in that the foamability of the ink can be reduced.

The heating temperature of the water-based pigment dispersion and the water-based pigment ink of the present invention is preferably 40° C. to 80° C., and more preferably 50° C. to 70° C., and the heating time is preferably 1 hour to 336 hours, and more preferably 5 hours to 96 hours. When the heating temperature is lower than 40° C., it takes a long time to stabilize the dispersion, and the dispersion stability is insufficient. When the heating temperature is higher than 80° C., in contrast, the dispersion is destroyed.

In each of the following cases i.e. the case where a water-based pigment ink is prepared using the water-based pigment dispersion that has been subjected to the heat treatment, and the case where a water-based pigment ink that has been prepared using an unheated water-based pigment dispersion is subjected to the heat treatment, it is preferred, after preparation of the water-based pigment ink, to remove coarse particles and foreign matters such as dust and refuse by filtering the prepared water-based pigment ink under reduced pressures and increased pressures using a metal filter, a membrane filter and by centrifugalizing and filtering the water-based pigment ink using a centrifuge.

(Ink Cartridge)

The ink cartridge of the present invention is provided with a container to house the water-based pigment ink of the present invention and is further provided with other members suitably selected in accordance with the necessity.

The container is not particularly limited, may be suitably selected in terms of the shape, structure, size, material, or the like, in accordance with the intended use, and preferred examples thereof include containers having at least an ink bag which is formed with aluminum laminate film, resin film, or the like.

Figure 2:
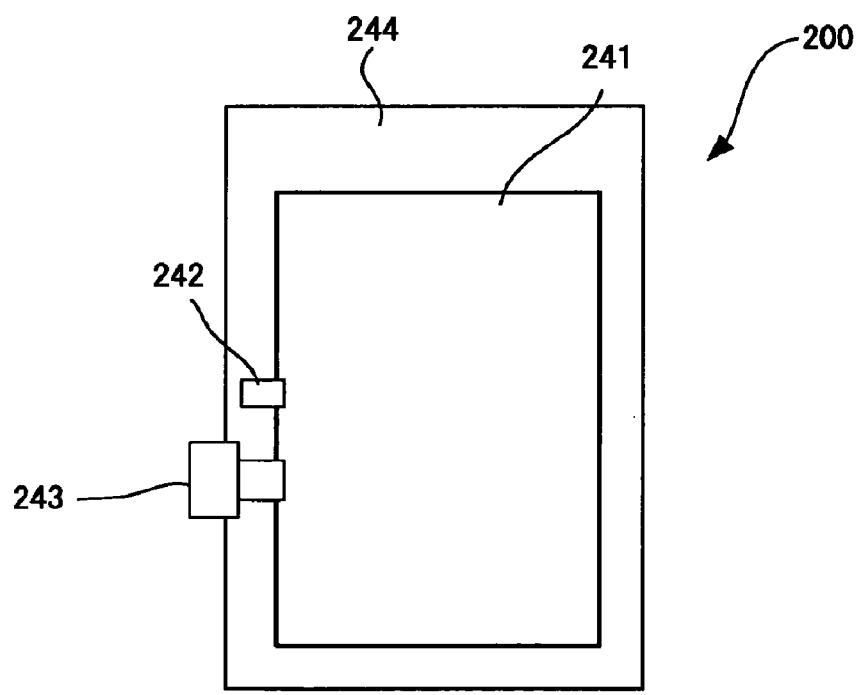
FIG. 2 is a schematic view showing the ink cartridge shown in FIG. 1 including an ink cartridge case which houses the ink cartridge.

Hereinafter the ink cartridge of the present invention will be described referring to FIGS. 1 and 2. FIG. 1 is a schematic view exemplarily showing the ink cartridge of the present invention, and FIG. 2 is a schematic view showing the ink cartridge shown in FIG. 1 including a ink cartridge case to house the ink cartridge.

In ink cartridge 200, as shown in FIG. 1, the water-based pigment ink is poured from ink inlet 242 into ink bag 241, and the ink inlet 242 was closed by fusing the inlet after the air is discharged. In use of the ink cartridge 200, a needle fixed in the body of the printing apparatus is stuck into ink outlet 243 which is made of a rubber member to thereby supply the water-based pigment ink to the printing apparatus.

Typically, the ink bag 241 is formed using a wrapping member such as aluminum laminate film being not gas transmissive. The ink is bag 241, as shown in FIG. 2, is typically housed in plastic cartridge case 244 and is to be detachably equipped with various inkjet recording apparatuses for use.

The inkjet cartridge of the present invention can house the water-based pigment ink (ink set) of the present invention and can be detachably equipped with various inkjet recording apparatuses. Further, it is particularly preferable that the inkjet cartridge is detachably equipped with the inkjet recording apparatus of the present invention which will be described hereinafter.

(Inkjet Recording Apparatus and Inkjet Recording Method)

The inkjet recording apparatus of the present invention is provided with an ink flying unit and is further provided with other units suitably selected in accordance with the necessity, for example, an impulse generating unit, and a controlling unit.

The inkjet recording method of the present invention includes making an ink fly and further includes other steps suitably selected in accordance with the necessity, for example, generating an impulse, and controlling.

The inkjet recording method of the present invention can be favorably carried out using the inkjet recording apparatus of the present invention, and the flying an ink can be favorably performed using the ink flying unit. The other steps can be favorably performed using other units.

—Flying an Ink and Ink Flying Unit—

In the flying an ink, an image is formed by making the water-based pigment ink fly by giving an impulse to the water-based pigment ink of the present invention.

The ink flying unit is configured to make the water-based pigment ink fly by giving an impulse to the water-based pigment ink of the present invention. The ink flying unit is not particularly limited, and examples thereof include various ink ejection nozzles.

In the present invention, at least a part of a liquid chamber, a fluid resistance part, a diaphragm, and a nozzle member is preferably formed using a material containing at least one selected from silicon and nickel.

The nozzle diameter of the inkjet nozzle is preferably 30 μm or less, and more preferably 1 μm to 20 μm.

The impulse can be generated, for example, by means of the impulse generating unit, and the impulse is not particularly limited, may be suitably selected in accordance with the intended use, and examples thereof include heat (temperature), pressure, vibration, and light. Each of these impulses may be used alone or in combination of two or more. Of these, heat and pressure are preferably used.

Examples of the impulse generating unit include heaters, pressurizing devices, piezoelectric elements, vibration generators, ultra-sonic oscillators, and light. Specific examples of the impulse generating unit include piezoelectric actuators such as piezoelectric elements; thermal actuator utilizing phase changes attributable to film boiling of the liquid by using an electric heat exchanger element such as exothermic resistor, shape-memorizing alloy actuators using metal phase changes attributable to temperature change, and an electrostatic actuator using electrostatic force.

The aspect of the flying the water-based pigment ink is not particularly limited and differs depending on the type of the impulse. For example, when the impulse is from heat, there is a method in which a heat energy in accordance with a recording signal is given to the water-based pigment ink in the recording head by using, for example, a thermal head to generate air bubbles in the water-based pigment ink by means of the effect of the heat energy and to thereby eject and spray the water-based pigment ink as droplets from a nozzle hole of the recording head by means of the effect of the pressure of the air bubbles. When the impulse is from pressure, for example, there is a method in which a pressure is applied to a piezoelectric element which is bonded to the position called as a piezoelectric chamber residing in the flow path within the recording head to make the piezoelectric element bend to shrink the inner volume of the piezoelectric chamber and to thereby eject and spray the water-based pigment ink as droplets.

The size of the droplets of the water-based pigment ink to fly is preferably, for example, 3 pl to 40 pl, the ejecting and spraying speed is preferably set at 5 m/s to 20 m/s, the drive frequency is preferably set at 1 kHz or more, and the resolution is preferably set at 300 dpi or more.

The controlling unit is not particularly limited as far as movements of each of the units can be controlled, may be suitably selected in accordance with the intended use, and examples thereof include machines such as sequencers, and computers.

Figure 3:
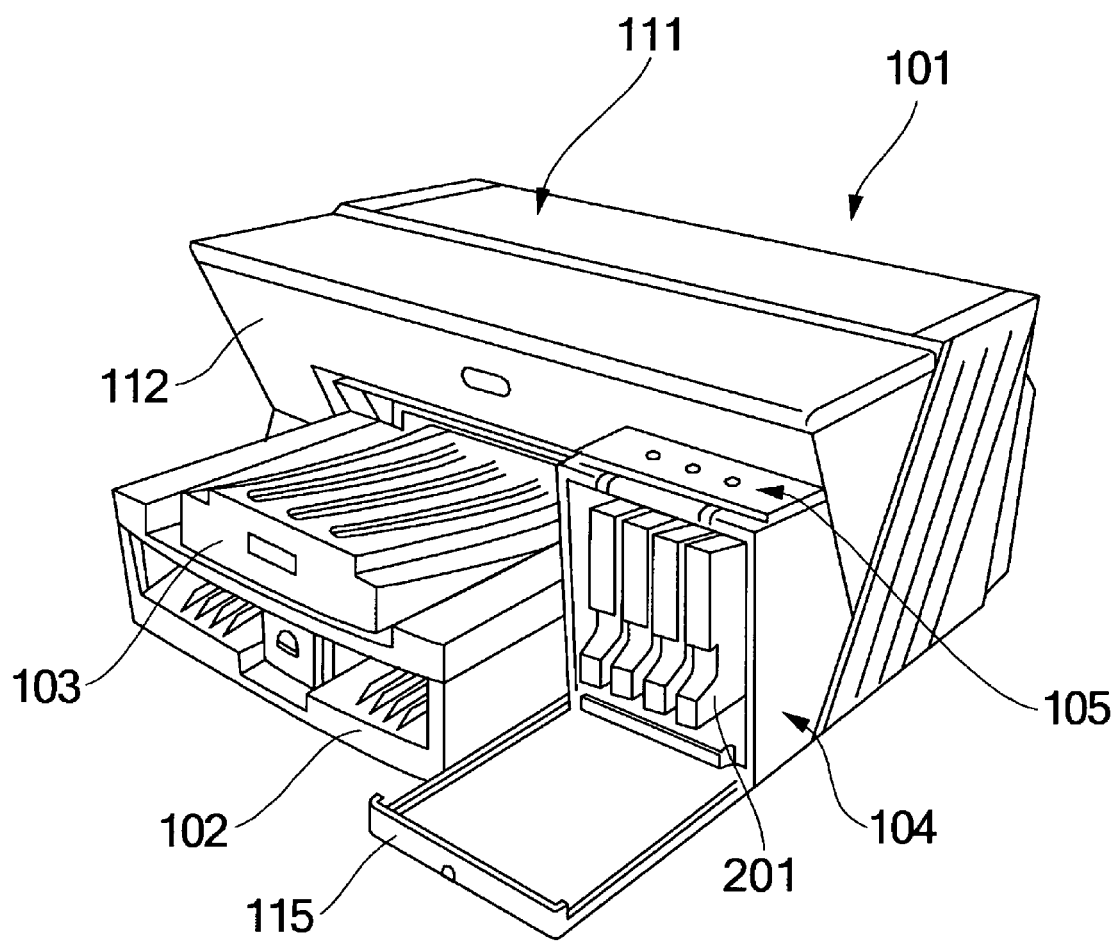
FIG. 3 is a perspective view illustrating the inkjet recording apparatus of the present invention in a condition where the cover of the ink cartridge mounting part is opened.

Hereinafter, an aspect for performing the inkjet recording method of the present invention using the inkjet recording apparatus of the present invention will be described referring to drawings. The inkjet recording apparatus shown in FIG. 3 is provided with apparatus body 101, paper supply tray 102 to supply a paper sheet to be loaded on the apparatus body 101, paper ejecting tray 103 installed to the apparatus body 101 and stocking the paper sheet with an image recorded (formed) thereon, and ink cartridge mounting part 104. On the upper surface of the ink cartridge mounting part 104, operating part 105 such as operation keys and indicators is arranged. The ink cartridge mounting part 104 is provided with openable and closable front cover 115 for detaching and attaching ink cartridge 201.

Figure 4:
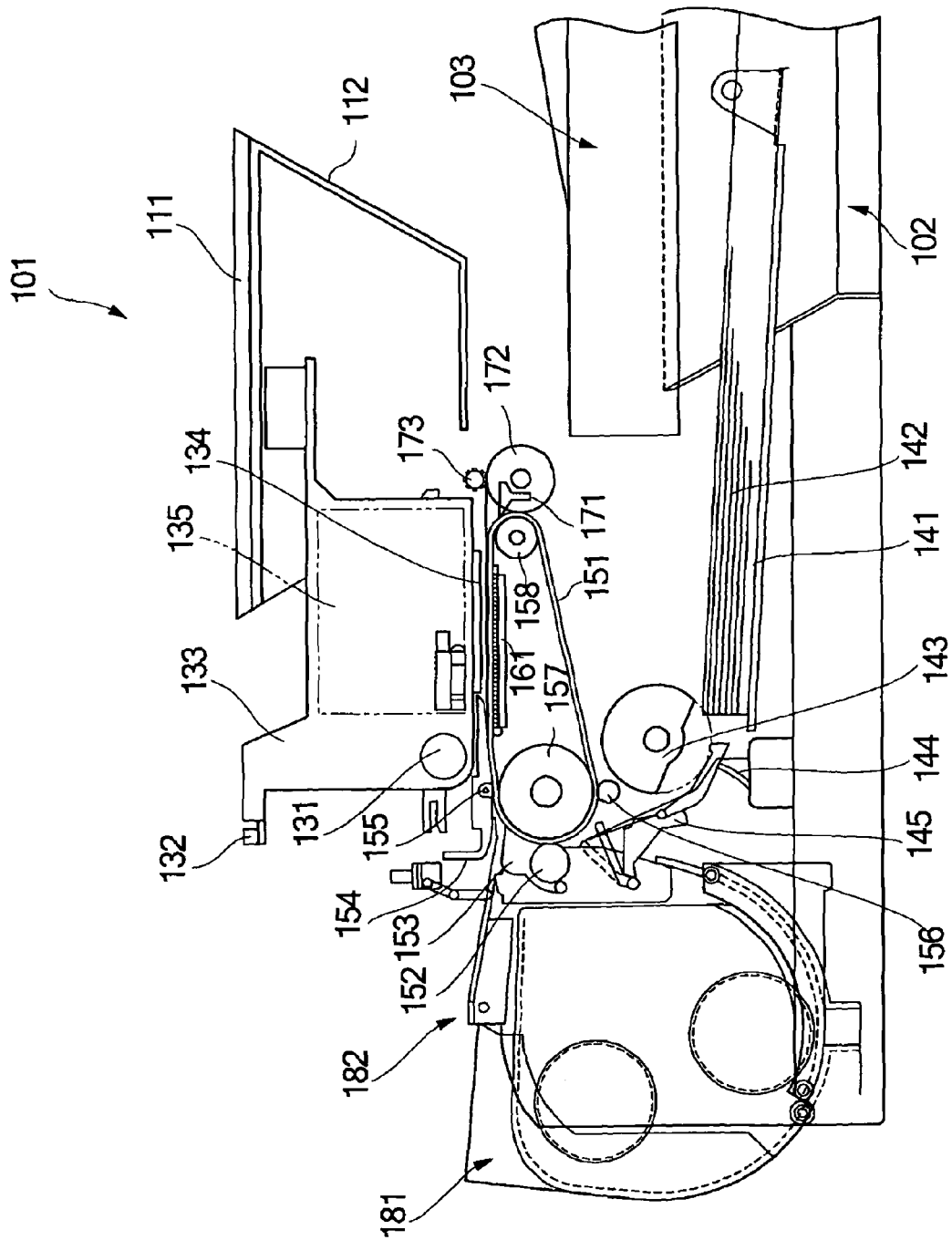
FIG. 4 is a block diagram schematically illustrating the entire structure of the inkjet recording apparatus of the present invention.
Figure 5:
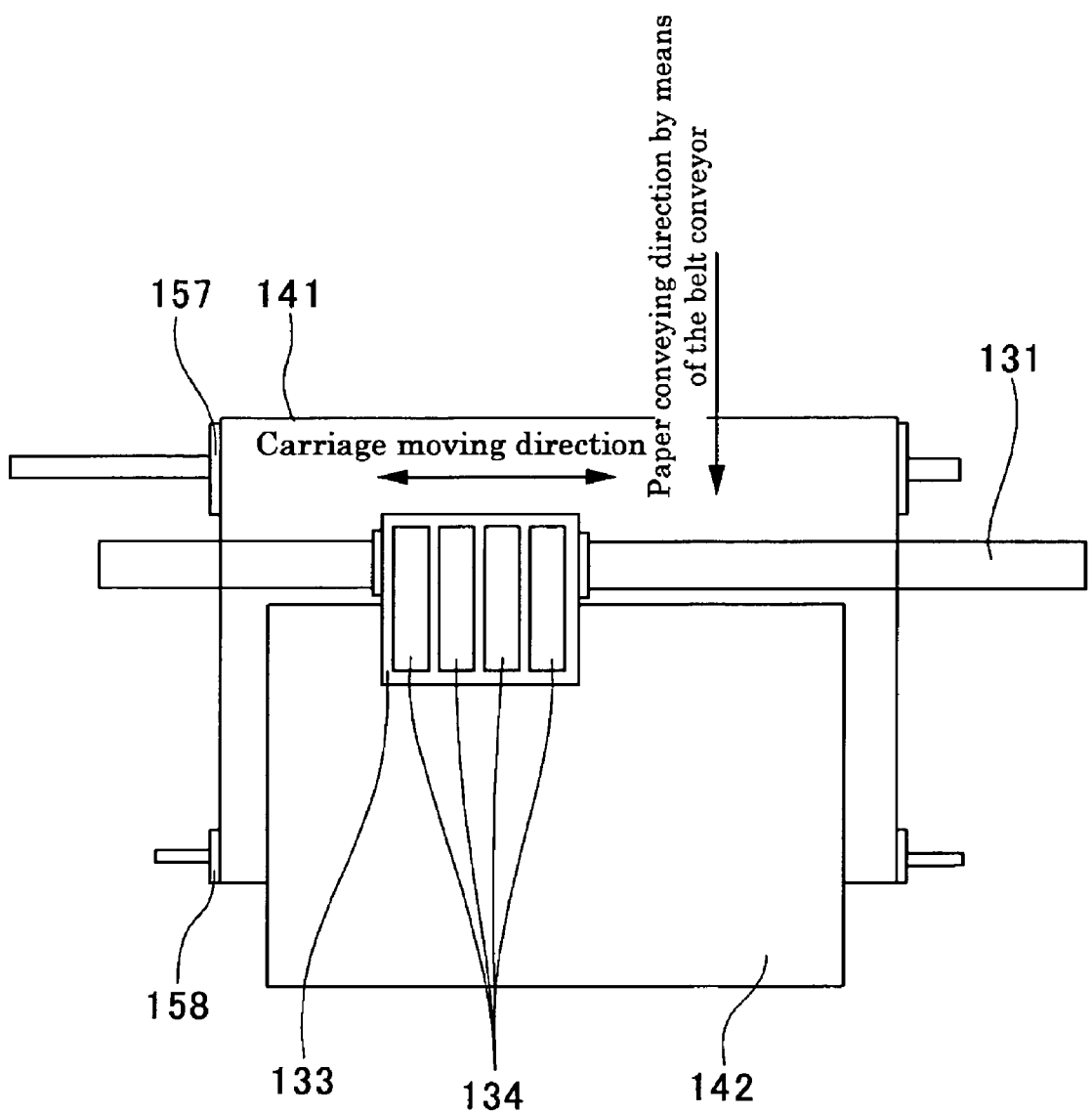
FIG. 5 is an enlarged view schematically showing an example of the inkjet head of the present invention.

In the apparatus body 101, as is seen in FIGS. 4 and 5, by means of guide rod 131 and stay 132 each of which are a guide member laterally suspended to a right plate (not shown) and a left plate (not shown), a carriage 133 is held in such that the carriage 133 can slidably move in the main scanning direction. With the above structure, a main scanning motor (not shown) may move the carriage 133 in the direction indicated by the arrow in FIG. 5 for scanning.

The carriage 133 is provided with recording head 134 having four inkjet recording heads for ejecting respective four ink droplets of yellow (Y), cyan (C), magenta (M) and black (Bk). Here, a plurality of ink ejection ports of the recording head 134 are arranged in a direction intersecting with the main scanning direction. The recording head 134 defines an ink droplet ejecting direction turning downward.

For the inkjet recording head constituting the recording head 134, it is possible to use the one having an actuator as stated below and the like as an energy generating unit for ejecting the ink: piezoelectric actuators such as piezoelectric elements; thermal actuator utilizing phase changes attributable to film boiling of the liquid by using an electric heat exchanger element such as exothermic resistor, shape-memorizing alloy actuators using metal phase changes attributable to temperature change, and an electrostatic actuator using electrostatic force.

The carriage 133 is provided with subtanks 135 for supplying various color inks to the recording head 134. By way of an ink supply tube (not shown), the water-based pigment ink of the present invention can be supplied to one of the subtanks 135 from the ink cartridge 201 which is mounted to the ink cartridge mounting part 104 of the present invention.

On the other hand, as a paper feeding part for feeding a paper sheet 142 loaded on paper loading part 141 (pressure plate) of the paper supply tray 102, there is provided lunula roll 143 (paper feed roll), and separating pad 144 which is made of material having a large friction coefficient, and the separating pad 144 is arranged to face lunula roll 143 (paper feed roll). At the paper feeding part, the lunula roll 143 separates the paper sheet 142 one-by-one and conveys the thus separated paper sheet 142 from the paper loading part 141. The separating pad 144 is biased to the side of the paper feed roll 143.

As a conveying part for conveying the thus supplied paper sheet 142 below the recording head 134 supplied from the paper supply part, there are provided conveyor belt 151 for electrostatically absorbing the paper sheet 142 and conveying the paper sheet 142, counter roller 152 for conveying the paper sheet 142 conveyed from the paper supply part via a guide 145 by interposing the paper sheet 142 between the conveyor belt 151 and the counter roller 152, conveyor guide 153 for turning the paper sheet 142 which is conveyed substantially vertically upward by about 90° to thereby smoothly put the paper sheet 142 on the conveyor belt 151, and end pressuring roll 155 biased toward the side of the conveyor belt 151 by means of a pressing member 154. Moreover, there is provided a charge roller 156 which is a charging unit for charging one surface of the conveyor belt 151.

Herein, the conveyor belt 151 is an endless belt which is spanned over conveyor roller 157 and tension roller 158, to thereby have such a structure to as rotate in the belt conveying direction. The conveyor belt 151 is made from, for example, a pure resin which is not subjected to resistance control and has a thickness about 40 μm. The conveyor belt 151 has a surface layer for paper absorbing face which is made of, for example, an ETFE copolymer material of tetrafluoroethylene and ethylene, and has a back layer (intermediary resistance layer, or earth layer) which is made of the same material as that for the surface layer and is subjected to the resistance control.

The conveyor belt 151 has a backside where a guide member 161 is located corresponding to a printing-photographing area defined by the recording head 134. As a paper ejecting part for ejecting the paper sheet 142 recorded by the recording head 134, there are provided separating claw 171 for separating the paper sheet 142 from the conveyor belt 151, paper ejecting roller 172, paper ejecting roll 173, and the paper ejecting tray 103 below the ejecting roller 172.

On the back face of the apparatus body 101, double-sided paper supply unit 181 is detachably mounted. The double-sided paper supply unit 181 takes therein the paper sheet 142 returned in an opposite rotary direction of the conveyor belt 151, and reverses the thus taken paper sheet 142 to thereby supply the paper sheet 142 again to between the counter roller 152 and the conveyor belt 151. The double-sided paper supply unit 181 has an upper face provided with manual paper feed part 182.

With the above structure of the inkjet recording apparatus, the paper sheet 142 may be separated one by one and supplied from the paper supply part substantially vertically upward, and then be guided by the guide 145, and then be interposed between the conveyor belt 151 and the counter roller 152 and conveyed. Then, with the end of the paper sheet 142 guided by the conveyor guide 153, the paper sheet 142 may be pressed on to the conveyor belt 151 by means of the end pressing roll 155 for turning by about 90°.

Here, the conveyor belt 157 is charged by the charging roller 156, and the paper sheet 142 is electrostatically absorbed to the conveyor belt 151 for conveyance. Moving the carriage 133 while driving the recording head 134 corresponding to an image signal can make a recording of 1 line by ejecting the ink droplet to the stationary paper sheet 142. Then, after the paper sheet 142 is conveyed in a predetermined amount of sheets, the next line recording is to be carried out. With a recoding end signal received or a signal signifying that the back end of the paper sheet 142 reached the recording area received, the recording operation is to be finished, to thereby eject the paper sheet 142 to the paper ejecting tray 103.

When it is sensed that the ink remnant comes to "near end" in the subtank 135, a predetermined amount of ink is to be supplied to the subtank 135 from the ink cartridge 201.

With the inkjet recording apparatus having the ink cartridge 201 of the present invention, when the water-based pigment ink in the ink cartridge 201 is used up, replacing only the ink bag is possible by disassembling the case body of the ink cartridge 201. Even when the ink cartridge 201 is placed longitudinally and loaded on the front surface thereof, the ink can be supplied stably. With this, even when the apparatus body 101 has a blocked upper part, for example, the apparatus body 101 is placed in a rack, or when an object is put on the upper surface of the apparatus body 101, replacing the ink cartridge 201 is accomplished with ease.

Hereinabove described is an example in which the water-based pigment ink is applied to a serial (shuttle) inkjet recording apparatus having a carriage moving for scanning. The water-based pigment ink of the present invention may also be applied to so-called a line type inkjet recording apparatus which is equipped with a line head.

Further, the inkjet recording apparatus and the inkjet recording method of the present invention may be applied to various types of recording by means of inkjet recording methods and may be particularly suitably applied to, for example, inkjet recording printers, facsimiles, copiers, complex machines of a printer, a facsimile and a copier.

(Ink Record)

An ink record recorded by means of the inkjet recording apparatus and the inkjet recording method of the present invention is the ink record of the present invention. The ink record of the present invention contains an image formed on a recording medium using the water-based pigment ink of the present invention.

The recording medium is not particularly limited, may be suitably selected in accordance with the intended use, and examples thereof include regular paper, gloss paper, exclusive paper, fabric, film, and OHP sheet. Each of these recording media may be used alone or in combination with two or more.

The ink records have a high-quality of image without causing a substantial amount of exudates of the ink and excel in temporal stability, and thus the ink records may be suitably used for various purposes as documents or information materials with various printing and/or images recorded thereon.

EXAMPLES

Hereinafter, the present invention will be further described in detail referring to examples of the present invention. However, the present invention is not limited to the disclosed examples. It should be noted that "part" and "parts" described in the Examples and Comparative Examples represent "part by mass" and "parts by mass", respectively.

Example 1

—Preparation of Pigment Dispersion—

Pigment type α: C.I. Pigment Red 122 (CROMOPHTAL JET Magenta DMQ, manufactured by Chiba Specialty Chemicals K.K.) . . . 150 parts Compound represented by General Formula (I) (n=40) . . . 53 parts Resin emulsion a (Table 4) . . . 5 parts Distilled water . . . 797 parts After premixing the composition stated above, a resin emulsion was added to a liquid prepared by dispersing a zirconia ball medium having a diameter of 0.3 mm by means of a disc type BEADS MILL (KDL model, manufactured by Sinmaru Enterprises Corporation) under circulation, and the mixture was heated at a temperature of 60° C. for 30 hours, centrifugalized and filtered using a centrifuge to remove coarse particles and refuse to thereby obtain a water-based pigment dispersion having the average particle diameter of 70 nm.

Example 2

—Preparation of Pigment Dispersion—

Pigment type β: C.I. Pigment Blue 15:3 (Cyanin Blue A-3108, manufactured by Dainichiseika Color & Chemicals Mfg. Co., Ltd.) - - - 150 parts Water-soluble styrene-acrylic resin (HPD-96, manufactured by Johnson Polymer Co., Ltd.) . . . 75 parts Resin emulsion b (Table 4) . . . 3 parts Pionine A-51-B (manufactured by Takemoto Oil & Fat Co., Ltd.) . . . 2.5 parts Distilled water . . . 773 parts After premixing the composition stated above, a resin emulsion was added to a liquid prepared by dispersing a zirconia ball medium having a diameter of 0.3 mm by means of a disc type BEADS MILL (KDL model, manufactured by Sinmaru Enterprises Corporation) under circulation, and the mixture was heated at a temperature of 75° C. for 10 hours, centrifugalized and filtered using a centrifuge to remove coarse particles and refuse to thereby obtain a water-based pigment dispersion having the average particle diameter of 120 nm.

Example 3

—Preparation of Pigment Dispersion—

Pigment type γ: C.I. Pigment Yellow 74 (Yellow No. 43, manufactured by Dainichiseika Color & Chemicals Mfg. Co., Ltd.) . . . 150 parts Compound represented by General Formula (I) (n=10) . . . 263 parts Resin emulsion c (Table 4) . . . 10 parts Distilled water . . . 587 parts After premixing the composition stated above, a resin emulsion was added to a liquid prepared by dispersing a zirconia ball medium having a diameter of 0.3 mm by means of a disc type BEADS MILL (KDL model, manufactured by Sinmaru Enterprises Corporation) under circulation, and the mixture was heated at a temperature of 50° C. for 95 hours, centrifugalized and filtered using a centrifuge to remove coarse particles and refuse to thereby obtain a water-based pigment dispersion having the average particle diameter of 20 nm.

Example 4

—Preparation of Pigment Dispersion—

Pigment type α: C.I. Pigment Red 122 (CROMOPHTAL JET Magenta, manufactured by Chiba Specialty Chemicals K.K.) - - - 150 parts Compound represented by General Formula (I) (n=10) . . . 113 parts Resin emulsion d (Table 4) . . . 5 parts Distilled water . . . 737 parts After premixing the composition stated above, a resin emulsion was added to a liquid prepared by dispersing a zirconia ball medium having a diameter of 0.3 mm by means of a disc type BEADS MILL (KDL model, manufactured by Sinmaru Enterprises Corporation) under circulation, and the mixture was heated at a temperature of 60° C. for 30 hours, centrifugalized and filtered using a centrifuge to remove coarse particles and refuse to thereby obtain a water-based pigment dispersion having the average particle diameter of 70 nm.

Example 5

Preparation of Pigment Dispersion

Pigment type β: C.I. Pigment Blue 15:3 (Cyanin Blue A-3108, manufactured by Dainichiseika Color & Chemicals Mfg. Co., Ltd.) - - - 150 parts Compound represented by General Formula (I) (n=80) . . . 188 parts Resin emulsion a (Table 4) . . . 3 parts Pionine A-51-B (manufactured by Takemoto Oil & Fat Co., Ltd.) . . . 2.5 parts Distilled water . . . 660 parts After premixing the composition stated above, a resin emulsion was added to a liquid prepared by dispersing a zirconia ball medium having a diameter of 0.3 mm by means of a disc type BEADS MILL (KDL model, manufactured by Sinmaru Enterprises Corporation) under circulation, and the mixture was heated at a temperature of 75° C. for 10 hours, centrifugalized and filtered using a centrifuge to remove coarse particles and refuse to thereby obtain a water-based pigment dispersion having the average particle diameter of 60 nm.

Example 6

—Preparation of Pigment Dispersion—

Pigment type γ: C.I. Pigment Yellow 74 (Yellow No. 43, manufactured by Dainichiseika Color & Chemicals Mfg. Co., Ltd.) - - - 150 parts Compound represented by General Formula (I) (n=130) . . . 30 parts Resin emulsion b (Table 4) . . . 10 parts Distilled water . . . 820 parts After premixing the composition stated above, a resin emulsion was added to a liquid prepared by dispersing a zirconia ball medium having a diameter of 0.3 mm by means of a disc type BEADS MILL (KDL model, manufactured by Sinmaru Enterprises Corporation) under circulation, and the mixture was heated at a temperature of 50° C. for 120 hours, centrifugalized and filtered using a centrifuge to remove coarse particles and refuse to thereby obtain a water-based pigment dispersion having the average particle diameter of 50 nm.

Example 7

—Preparation of Pigment Dispersion—

Pigment type β: C.I. Pigment Blue 15:3 (Cyanin Blue A-3108, manufactured by Dainichiseika Color & Chemicals Mfg. Co., Ltd.) - - - 150 parts Compound represented by General Formula (I) (n=40) . . . 30 parts Resin emulsion a (Table 4) . . . 5 parts Distilled water . . . 820 parts After premixing the composition stated above, a resin emulsion was added to a liquid prepared by dispersing a zirconia ball medium having a diameter of 0.3 mm by means of a disc type BEADS MILL (KDL model, manufactured by Sinmaru Enterprises Corporation) under circulation, and the mixture was heated at a temperature of 75° C. for 10 hours, centrifugalized and filtered using a centrifuge to remove coarse particles and refuse to thereby obtain a water-based pigment dispersion having the average particle diameter of 250 nm.

Comparative Example 1

—Preparation of Pigment Dispersion—

Pigment type α: C.I. Pigment Red 122 (CROMOPHTAL JET Magenta DMQ, manufactured by Chiba Specialty Chemicals K.K.) - - - 150 parts Compound represented by General Formula (I) (n=10) . . . 113 parts Distilled water . . . 737 parts After premixing the composition stated above, no resin emulsion was added to a liquid prepared by dispersing a zirconia ball medium having a diameter of 0.3 mm by means of a disc type BEADS MILL (KDL model, manufactured by Sinmaru Enterprises Corporation) under circulation, and the liquid was heated at a temperature of 60° C. for 30 hours, centrifugalized and filtered using a centrifuge to remove coarse particles and refuse to thereby obtain a water-based pigment dispersion having the average particle diameter of 450 nm.

Comparative Example 2

—Preparation of Pigment Dispersion—
  Pigment type β: C.I. Pigment Blue 15:3 (Cyanin Blue A-385, manufactured by Dainichiseika Color & Chemicals Mfg. Co., Ltd.) - - - 150 parts
  Compound represented by General Formula (I) (n=40) . . . 53 parts
  Resin emulsion b (Table 4) . . . 3 parts
  Pionine A-51-B (manufactured by Takemoto Oil & Fat Co., Ltd.) . . . 2.5 parts
  Distilled water . . . 794 parts After premixing the composition stated above, a resin emulsion was added to a liquid prepared by dispersing a zirconia ball medium having a diameter of 0.3 mm by means of a disc type BEADS MILL (KDL model, manufactured by Sinmaru Enterprises Corporation) under circulation. Then, the mixture was not heated, however, the mixture was centrifugalized and filtered using a centrifuge to remove coarse particles and refuse to thereby obtain a water-based pigment dispersion having the average particle diameter of 100 nm.

TABLE 1

|   | Pigment type Added amount | Dispersing agent type Ratio of Dispersing agent | Resin emulsion type Added amount | Distilled water Added amount | Heating temperature (°C.) | Heating time (hr) |
|---|---|---|---|---|---|---|
| Ex. 1 | α 150 parts | (2) 0.35 | a 5 parts | 797 parts | 60 | 30 |
| Ex. 2 | β 150 parts | (5) 0.5 | b 3 parts | 773 parts | 75 | 10 |
| Ex. 3 | γ 150 parts | (1) 1.75 | c 10 parts | 587 parts | 50 | 95 |
| Ex. 4 | α 150 parts | (1) 0.75 | d 5 parts | 737 parts | 60 | 30 |
| Ex. 5 | β 150 parts | (4) 1.25 | a 3 parts | 660 parts | 75 | 10 |
| Ex. 6 | γ 150 parts | (3) 0.2 | b 10 pars | 820 parts | 50 | 120 |
| Ex. 7 | β 150 parts | (2) 0.35 | a 5 parts | 820 parts | 75 | 10 |
| Compara. Ex. 1 | α 150 parts | (1) 0.75 | — Not added | 737 parts | 60 | 30 |
| Compara. Ex. 2 | β 150 parts | (2) 0.35 | b 3 parts | 794 parts | Not heated | Not heated |

* The "ratio of dispersing agent" is a value determined by dividing the mass of the dispersing agent by the mass of the pigment.
* For the wetting agent added at the preparation of the water-based pigment dispersion, A-51-B manufactured by Takemoto Oil & Fat Co., Ltd. was used.

In Table 1, the contents and the physical properties of the pigment types α, β, and γ and dispersing agents (1) to (5), and resin emulsions A to D are as follows.

TABLE 2

| Pigment Type | C.I. (manufactured by) |
|---|---|
| Pigment Type α | Pigment Red 122 (Chiba Specialty Chemicals K.K.) |
| Pigment Type β | Pigment Blue 15:3 (Dainichiseika Color & Chemicals Mfg. Co., Ltd.) |
| Pigment Type γ | Pigment Yellow 74 (Dainichiseika Color & Chemicals Mfg. Co., Ltd.) |

TABLE 3

| Dispersing agent | Type of dispesing agent |
|---|---|
| (1) | Compound represented by General Formula (1) (n = 10) |
| (2) | Compound represented by General Formula (1) (n = 40) |
| (3) | Compound represented by General Formula (1) (n = 130) |
| (4) | Compound represented by General Formula (1) (n = 80) |
| (5) | Water-soluble styrene-acrylic resin (HPD-96, manufactured by Johnson Polymer Co., Ltd. |

TABLE 4

| Resin emulsion | | Ionic character | Structure |
|---|---|---|---|
| a | W-5025 manufactured by Mitsui Takeda Chemicals, Inc. | Anionic resin emulsion Self-emulsified type | Ether type |

TABLE 4-continued

| Resin emulsion | Ionic character | Structure |
|---|---|---|
| b | W-5661 manufactured by Mitsui Takeda Chemicals, Inc. | Anionic resin emulsion Self-emulsified type | Ether type |
| c | SF650 manufactured by DAIICHI KOGYO SEIYAKU CO., LTD. | Cationic resin emulsion Self-emulsified type | Polycarbonate type |
| d | W-7004 manufactured by Mitsui Takeda Chemicals, Inc. | Anionic resin emulsion Self-emulsified type | Ester type |

Next, each of the water-based pigment dispersion was prepared in accordance with the formulation shown in Table 1. Using the each of the water-based pigment dispersion, respective water-based pigment inks were prepared in accordance with the formulation shown in Table 5. The thus obtained water-based pigment ink was heated, centrifugalized and filtered using a centrifuge and then filtered through a membrane filter with a 0.8 μm mesh to thereby prepare the water-based pigment ink of the present invention. In Table 5, glycerin is abbreviated as "Gly", diethylene glycol is abbreviated as "DEG", a 20% antiseptic agent solution of proxcel LV(S) was abbreviated as "LV", and 2-ethyl-1,3-hexanediol was abbreviated as "EHD".

As for the preparation method of the water-based pigment ink, (1) GlyDEG, (2) EHD, (3) surfactant, (4) LV, and (5) emulsion resin and highly purified water were poured in a vessel in this order, the mixed solution was stirred for 30 minutes, and the solution was added to the respective water-based pigment dispersions. The respective water-based pigment dispersions were adjusted to a pH of about 7 to and then stirred for 30 minutes to prepare each of the water-based pigment ink.

TABLE 7

| Surfactant | Type |
|---|---|
| I | D-1007 (Takemoto Oil & Fat Co., Ltd.) |
| II | D-1010 (Takemoto Oil & Fat Co., Ltd.) |

Each of the thus obtained water-based pigment inks in Examples 1 to 10 and Comparative Examples 1 to 4 was poured into a black cartridge of a remodeled inkjet printer, EM-930 manufactured by SEIKO EPSON CORP, and subjected to vacuum deairing to check the ejection stability of each of the water-based pigment ink using the remodeled inkjet printer. It should be noted that with respect to evaluation on the ejection property of each of the water-based pigment dispersion prepared in Example 1 to 7 and Comparative Examples 1 to 2, each of the ink compositions described in Table 5 was added to the each of the water-based pigment dispersion. Then, the ejection stability of the each of the water-based pigment dispersion was checked without being subjected to a heat treatment, using a water-based pigment ink obtained according to the preparation in Example 8. With respect to evaluation on the storage stability, each of the water-based pigment dispersion itself was evaluated. Table 8 shows the evaluation results.

<Evaluation 1: Ejection Stability>

The ejection stability of the obtained water-based pigment inks was evaluated as follows. After printing an ink record using the remodeled printer, the printer was left untouched at a temperature of 40° C. for one month in the condition where the printer head was capped. Whether the ejection condition of the ink left untouched in the printer recovered to the initial condition of the ink ejection or not was evaluated depending on the number of cleaning operations stated below. With respect to the water-based pigment dispersions shown in

TABLE 5

| | Dispersion type Added amount | Gly Added amount | DEG Added amount | EHD Added amount | Surfactant type Added amount | Resin Added amount | Distilled water Added amount | Heating temperature (° C.) | Heating time (hr) |
|---|---|---|---|---|---|---|---|---|---|
| Ex. 8 | No. 1 7.0 parts | 7.5 parts | 22.5 parts | 2.0 parts | II 2.0 parts | A 5.0 parts | Remaining parts | 50 | 40 |
| Ex. 9 | No. 2 6.0 parts | 7.5 parts | 22.5 parts | 2.0 parts | II 1.5 parts | B 2.5 parts | Remaining parts | 75 | 24 |
| Ex. 10 | No. 7 6.0 parts | 7.5 parts | 22.5 parts | 2.0 parts | I 2.0 parts | C 7.5 parts | Remaining parts | 60 | 96 |
| Compara. Ex. 3 | No. 1 7.0 parts | 7.5 parts | 22.5 parts | 2.0 parts | II 2.0 parts | A 1.5 parts | Remaining parts | Not heated | Not heated |
| Compara. Ex. 4 | No. 2 6.0 parts | 7.0 parts | 21.0 parts | 1.5 parts | II 1.5 parts | Not added | Remaining parts | 75 | 24 |

TABLE 6

| | Resin emulsion 1 Polyurethane | Resin emulsion 2 Styrene-acrylic resin | Resin emulsion 3 Silicone acrylic resin |
|---|---|---|---|
| A | W-5661 | Not added | Not added |
| B | W-5025 | Not added | AP4710 |
| C | W-5661 | J-840 | Not added |

* For the styrene-acrylic resin, J-840 (manufactured by Johnson Polymer Co., Ltd.) was used. For the silicone acrylic resin, AP4710 (manufactured by SHOWA HIGHPOLYMER CO., LTD.) was used. For the polyurethane resin, W-5661, and W-5025 (manufactured by Mitsui Takeda Chemicals, Inc., respectively) were used.

Table 1, each of the ink compositions described in Table 2 was added to the each of the water-based pigment dispersions. Then, the ejection stability of the each of the water-based pigment dispersion was checked without being subjected to a heat treatment, using a water-based pigment ink obtained according to the preparation in Example 8.

[Evaluation Criteria]

A: The ink ejection condition recovered to the initial condition by just once cleaning operation.

B: The ink ejection condition recovered to the initial condition by a couple of times of cleaning operation.

C: No restoration of the ink ejection condition was observed even when three times of cleaning operation or more were performed.

<Evaluation 2: Storage Stability of Water-Based Pigment Dispersion and Water-Based Pigment Ink>

The each of the inks was poured into a polyethylene vessel, respectively. The vessel was sealed closely and then stored at 70° C. for three weeks. The particle diameter, the surface tension, and the viscosity of the each of the inks after the storage were measured and evaluated based on a rate of change in particle diameter, surface tension, and viscosity obtained by comparing the resultant physical properties with the initial physical properties of the each of the ink. The evaluation criteria are as follows:

[Evaluation Criteria]

A: The rate of change in physical properties was within 10%.

B: The rate of change in physical properties was within 30%.

C: The rate of change in physical properties was more than 50%.

TABLE 8

|  | Evaluation 1 Ejection Stability | Evaluation 2 Storage Stability | Average particle diameter (nm) |
| --- | --- | --- | --- |
| Ex. 1 | A | A | 70 |
| Ex. 2 | A | B | 120 |
| Ex. 3 | B | A | 20 |
| Ex. 4 | A | B | 70 |
| Ex. 5 | A | A | 60 |
| Ex. 6 | B | A | 50 |
| Ex. 7 | B | A | 250 |
| Ex. 8 | A | A | 70 |
| Ex. 9 | A | B | 120 |
| Ex. 10 | B | A | 250 |
| Compara. Ex. 1 | C | C | 450 |
| Compara. Ex. 2 | B | C | 100 |
| Compara. Ex. 3 | B | C | 100 |
| Compara. Ex. 4 | C | C | 120 |

The above results show that it is possible to provide a water-based pigment dispersion and a water-based pigment ink in stable condition, without causing substantial changes in physical properties thereof and/or a large amount of agglutinated foreign matters regardless of change of temperature conditions by subjecting the water-based pigment dispersion and the water-based pigment ink to a heat treatment.

What is claimed is:

1. A method for producing a water-based pigment dispersion comprising:

heating a water-based pigment dispersion which comprises a pigment, a dispersing agent, a resin emulsion, and water;

wherein:

the dispersing agent comprises a compound represented by the following General Formula (1):

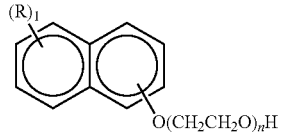

General Formula (1)

where R represents any one of an alkyl group, an aryl group, 1, is an integer of 0 to 7, and n is an integer of 20 to 200; and the resin emulsion comprises an anionic self-emulsified ether polyurethane resin emulsion.

2. The method for producing a water-based pigment dispersion according to claim 1, wherein the dispersing agent comprises a surfactant.

3. The method for producing a water-based pigment dispersion according to claim 1, wherein the dispersing agent is polyoxyethylene (n=40)β naphthylether.

4. The method for producing a water-based pigment dispersion according to claim 1, wherein the added amount of the dispersing agent is 0.1 parts by mass to 2 parts by mass relative to 1 part by mass of the pigment.

5. The method for producing a water-based pigment dispersion according to claim 1, wherein the average particle diameter of the pigment is 150 nm or less.

6. The method for producing a water-based pigment dispersion according to claim 1, wherein the water-based pigment dispersion is heated at a temperature of 40° C. to 80° C. for 1 hour to 336 hours.

7. A water-based pigment dispersion comprising:

a pigment,
a dispersing agent,
a resin emulsion, and
water, wherein:

the water-based pigment dispersion was subjected to a heat treatment;

the dispersing agent comprises a compound represented by the following General Formula (1):

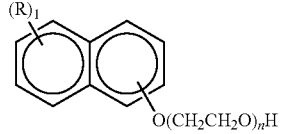

General Formula (1)

where R represents any one of an alkyl group, an aryl group, and an aralkyl group, l is an integer of 0 to 7, and n is an integer of 20 to 200; and the resin emulsion is an anionic self-emulsified ether polyurethane resin emulsion.

8. The water-based pigment dispersion according to claim 7, wherein the dispersing agent comprises a surfactant.

9. The water-based pigment dispersion according to claim 7, wherein the added amount of the dispersing agent is 0.1 parts by mass to 2 parts by mass relative to 1 part by mass of the pigment.

10. The water-based pigment dispersion according to claim 7, wherein the dispersing agent is polyoxyethylene(n=40)β naphthylether.

11. The water-based pigment dispersion according to claim 7, wherein the average particle diameter of the pigment is 150 nm or less.

12. The water-based pigment dispersion according to claim 7, wherein the water-based pigment dispersion is heated at a temperature of 40° C. to 80° C. for 1 hour to 336 hours.

13. A method for producing a water-based pigment ink comprising:
heating a water-based pigment ink,
wherein:
the water-based pigment ink comprises a pigment, a dispersing agent, an resin emulsion, and water;
the dispersing agent comprises a compound represented by the following General Formula (1):

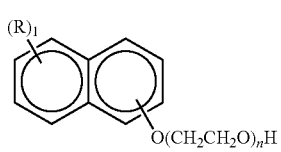

General Formula (1)

where R represents any one of an alkyl group, an aryl group, and an aralkyl group, l is an integer of 0 to 7, and n is an integer of 20 to 200; and
the resin emulsion comprises an anionic self-emulsified ether polyurethane resin emulsion.

14. The method for producing a water-based pigment ink according to claim 13, wherein the dispersing agent comprises a surfactant.

15. The method for producing a water-based pigment ink according to claim 13, wherein the added amount of the dispersing agent is 0.1 parts by mass to 2 parts by mass relative to 1 part by mass of the water-based pigment dispersion.

16. The method for producing a water-based pigment ink according to claim 13, wherein the dispersing agent is polyoxyethylene(n=40)β naphthylether.

17. The method for producing a water-based pigment ink according to claim 13, wherein the average particle diameter of the water-based pigment dispersion is 150 nm or less.

18. The method for producing a water-based pigment ink according to claim 13, wherein the water-based pigment ink is heated at a temperature of 40° C. to 80° C. for 1 hour to 336 hours.

19. A water-based pigment ink comprising:
a water-based pigment dispersion,
a dispersing agent,
a resin emulsion, and
water,
wherein:
the water-based dispersion comprises a pigment, a dispersing agent, a resin emulsion, and water;
the dispersing agent comprises a compound represented by the following General Formula (1):

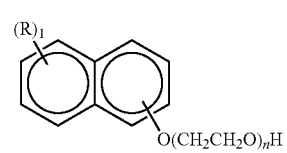

General Formula (1)

where R represents any one of an alkyl group, an aryl group, and an aralkyl group, l is an integer of 0 to 7, and n is an integer of 20 to 200; and
the resin emulsion comprises an anionic self-emulsified ether polyurethane resin emulsion.

20. The water-based pigment ink according to claim 19, wherein the dispersing agent comprises a surfactant.

21. The water-based pigment ink according to claim 19, wherein the added amount of the dispersing agent is 0.1 parts by mass to 2 parts by mass relative to 1 part by mass of the water-based pigment dispersion.

22. The water-based pigment ink according to claim 19, wherein the dispersing agent is polyoxyethylene(n=40)β naphthylether.

23. The water-based pigment ink according to claim 19, wherein the average particle diameter of the water-based pigment dispersion is 150 nm or less.

24. The water-based pigment ink according to claim 19, wherein the water-based pigment ink is heated at a temperature of 40° C. to 80° C. for 1 hour to 336 hours.

* * * * *